Sept. 17, 1940.  R. G. BURKART  2,215,387

VAPORIZER

Filed March 29, 1939

INVENTOR.
Rudolph G. Burkart
BY Williams, Rich & Morse
ATTORNEY.

Patented Sept. 17, 1940

2,215,387

UNITED STATES PATENT OFFICE 2,215,387

VAPORIZER

Rudolph G. Burkart, Hillside, N. J., assignor to Arlene Wilson, North Plainfield, N. J.

Application March 29, 1939, Serial No. 264,696

2 Claims. (Cl. 128—192)

This invention relates to vaporizers and has particular reference to vaporizers especially adapted for use in the production of inhalable vapors from oils and oily liquids for medicinal, therapeutic or other purposes.

In one form of apparatus with which the present invention is particularly adapted for use, the liquid to be vaporized is supplied from a reservoir to a heater unit comprising a vaporizer tube which is in direct communication with the reservoir and in which the liquid to be vaporized is maintained at a level corresponding at any instant to that of the source of supply, the tube being disposed at a suitable angle to the horizontal and provided at its upper or discharge end with an opening from which vapor produced in the tube under the action of heat applied thereto is discharged in condition to be administered.

Important objects of the present invention are to insure the user of such apparatus against being burned by accidental contact with the heater unit including the discharge end of its vaporizer tube; to insure the safe release of any excess or undue fluid pressure that may be set up in the vaporizer tube incident to the generation therein of an excessive amount of vapor, which is of necessity at a relatively high temperature; and to direct the excess vapor, incident to its release, along such path or paths of escape with relation to the direction of flow of vapor normally issuing from the discharge end of the vaporizer tube as to insure the user of the apparatus against encounter with the vapor thus released under excess pressure conditions.

Figure 1:
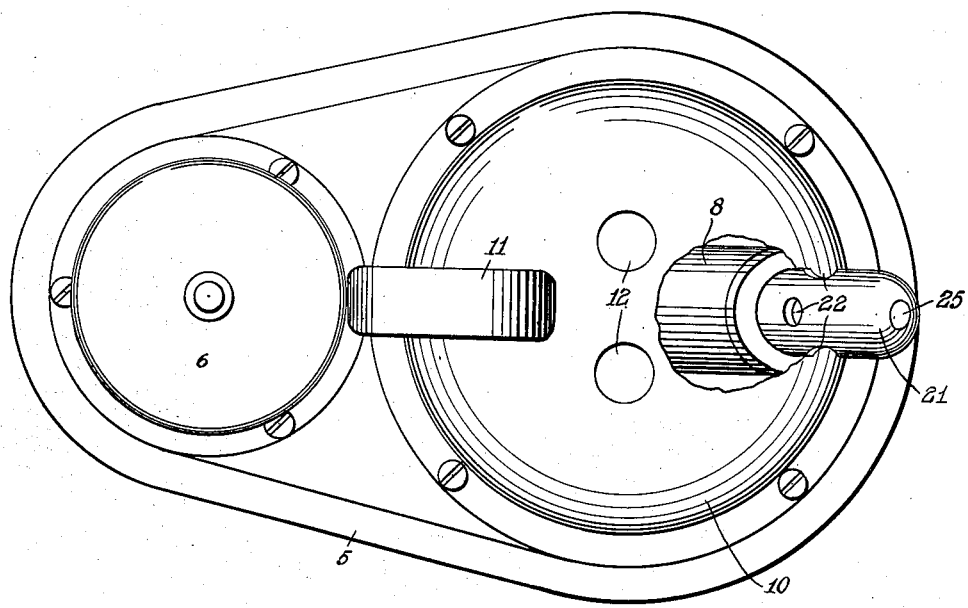
Figure 2:
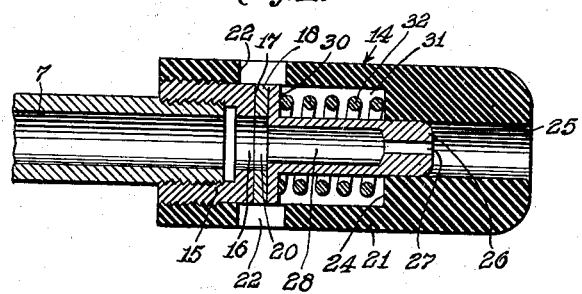

Other objects and advantages of the invention will become apparent from the following description, when taken in connection with the accompanying drawing, in which:

Fig. 1 is a plan view of an apparatus embodying the present invention, and Fig. 2 is a longitudinal central sectional view illustrating an improved nozzle and relief-valve unit associated with the upper or discharge end of a vaporizer tube which constitutes an element of the heater unit.

Although the present invention is adapted for use with various types of vaporizers, it is herein illustrated in connection with a vaporizer comprising generally a base 5 of suitable material, such as Bakelite, on which is mounted a reservoir 6 adapted for the reception of a liquid to be vaporized, the reservoir being in communication with the lower end of a vaporizer tube 7 which is inclined upwardly at an angle to the horizontal and constitutes an element of a heater unit 8 which may include an electric resistance element (not shown) by which the liquid content of tube 7 is vaporized.

In order to insure the user of the apparatus against being burned by accidental contact with the heater unit 8, including the upper or discharge end of the vaporizer tube 7, such unit is covered by a housing 10 of suitable heat-insulating material, such as Bakelite, and the upper or discharge end of the vaporizer tube is equipped, beyond the point where it projects through the housing 10, with a nozzle and relief-valve unit 14 which abuts the housing 10 and is constructed, especially in so far as its outer element is concerned, of suitable heat-insulating material such as Bakelite. The housing 10, which is connected to the base 5, is equipped with a handle 11 to facilitate the carrying of the apparatus from place to place and is provided with ventilating openings 12 to allow the escape of heat as it is radiated from the heater unit 8.

The nozzle and relief-valve unit 14 includes a bushing 15 suitably connected, as by screw-threads, to the upper end of the vaporizer tube 7, the bushing being formed with a central opening 16 and provided at its outer end with a flat surface 17 on which is supported a gasket-like seal 18, having a central opening 20 disposed in alignment with the opening 16 of the bushing. To the bushing 15 there is suitably connected, as by screw-threads, a valve and nozzle housing 21 constructed of suitable heat-insulating material, such as Bakelite. The wall of the housing 21 is provided in the vicinity of the transverse plane of the gasket-like seal 18 with one or more pressure-relief openings 22, and is formed substantially midway of its length with an internal shoulder 24 surrounding one end of a longitudinally extending guide passage 25 adapted for the reception of a slidable valve and nozzle element 26. The valve and nozzle element 26 is formed at its forward end with a relatively small discharge passage 27 coaxially disposed with relation to a vapor chamber 28, formed in the main body portion of the valve and nozzle element 26 and adapted to communicate with the vaporizer tube 7 by way of the openings 16 and 20 provided, respectively, in the bushing 15 and the gasket-like seal 18. The valve and nozzle element 26 is provided adjacent the inlet end of the vapor chamber 28 with an outwardly extending flange 30 which is dimensioned to snugly engage but yet slide on the inner wall surface of a spring chamber 31 with which the valve and nozzle housing 21 is provided. Within the spring chamber 31 there is disposed a compression spring 32, one end of which engages the shoulder 24 of the housing 21 and the other end of which engages the flange 30 of the valve and nozzle element 26, so that such element is normally held in a retracted position, as shown in Fig. 2, with its flange 30, which serves as a valve, maintained in intimate engagement with the gasket-like seal 18, which serves as a valve seat, so as to normally maintain the pressure-relief openings 22 closed with relation to the exit conduit, which includes the opening 16, the opening 20, the vapor chamber 28, the discharge passage 27 and the guide passage 25 and by way of which vapor normally passes from the vaporizer tube 7 to the atmosphere.

In normal operation, the vapor ejected from the discharge passage 27 is at a very high temperature for a short distance from the point of discharge, due to the high boiling point of the oil base of the medicament for which the apparatus is designed. After a short travel it is sufficiently cooled so as to present no danger of burning the user. For these reasons the housing 21 is so formed as to extend beyond the valve and nozzle element 26, thus not only preventing contact with the nozzle itself but also with the vapor discharging therefrom throughout the distance in which it is dangerously hot.

From the foregoing it will be understood how the above stated objects are accomplished. The housing 10 and its associated valve and nozzle unit 14 effectively function to insure the user of the apparatus against being burned by accidental contact with the heater unit, including the discharge end of the vaporizer tube 7. Under normal pressure conditions, the vapor generated within the vaporizer tube 7 is directed in its entirety to the atmosphere by way of the discharge passage 27 of the valve and nozzle element 26. The use of an excessive amount of heat or accidental clogging of the discharge passage 27 may result in excess or undue pressure in the vaporizer tube, incident to the generation therein of an excessive amount of vapor, which is of necessity at a relatively high temperature. Any such accidental excess pressure, however, will cause the valve and nozzle element 26 to move against the action of the spring 32, thus establishing communication between the vaporizer tube 7 and the atmosphere by way of the pressure-relief openings 22 so as to insure the safe release of such excess pressure. The excess vapor, upon its release to the atmosphere by way of the pressure-relief openings 22, is directed along such paths of escape with relation to the direction of flow of vapor normally issuing from the vaporizer tube 7 as to insure the user of the apparatus against encounter with the vapor as it is released under excess pressure conditions.

Although only one form of the invention is herein shown and described, it will be understood that various changes may be made without departing from the spirit of the invention or the scope of the following claims.

What is claimed is:

1. A vaporizer comprising a heater unit, said heater unit including a vaporizer tube having a discharge end from which vapor is discharged; a valve and nozzle unit carried by the discharge end of said vaporizer tube and comprising a valve and nozzle housing having a pressure-relief opening in its wall and provided interiorly with a valve seat adjacent said pressure-relief opening, a valve and nozzle element slidably carried within said housing and having at one end a discharge passage and at its other end an outwardly extending flange serving as a valve, and a spring functioning to normally maintain said flange in sealing relation to said valve seat whereby said pressure-relief opening is maintained closed with relation to said vaporizer tube, said spring being yieldable in a direction away from said valve seat whereby pressure applied to said valve and nozzle element in that direction and in excess of a predetermined value acts to displace said valve and nozzle element and establish communication between said pressure-relief opening and said vaporizer tube.

2. A vaporizer comprising a heater unit, said heater unit including a vaporizer tube having a discharge end from which vapor is discharged, a pressure-relief valve and nozzle unit carried by the discharge end of said vaporizer tube and comprising a valve and nozzle housing having a longitudinal guide passage and a pressure-relief opening in its wall and provided interiorly with a valve seat adjacent said pressure-relief opening, a valve and nozzle element having at one end a discharge passage and at its other end an outwardly extending flange serving as a valve, said element having its discharge end terminating within said guide passage so that the housing extends a substantial distance beyond said element, and a spring functioning to normally maintain said flange in sealing relation to said valve seat whereby said pressure-relief opening is maintained closed with relation to said vaporizer tube, said spring being yieldable in a direction away from said valve seat whereby pressure applied to said valve and nozzle element in that direction and in excess of a predetermined value acts to displace said valve and nozzle element and establish communication between said pressure-relief opening and said vaporizer tube.

RUDOLPH G. BURKART.